(12) United States Patent
Andreasen et al.

(10) Patent No.: US 11,356,459 B2
(45) Date of Patent: Jun. 7, 2022

(54) METHOD AND CONSOLE SERVER FOR CREATING AND MANAGING DISPATCH ROLE LISTS

(71) Applicant: MOTOROLA SOLUTIONS, INC., Chicago, IL (US)

(72) Inventors: Kurt Lund Andreasen, Taastrup (DK); John L. Finch, McHenry, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 253 days.

(21) Appl. No.: 16/869,613

(22) Filed: May 8, 2020

(65) Prior Publication Data
US 2021/0352079 A1    Nov. 11, 2021

(51) Int. Cl.
*G06F 7/04* (2006.01)
*G06F 15/16* (2006.01)
*H04L 29/06* (2006.01)
*H04L 9/40* (2022.01)
*H04W 4/10* (2009.01)
(Continued)

(52) U.S. Cl.
CPC .............. *H04L 63/105* (2013.01); *H04W 4/10* (2013.01); *H04W 12/08* (2013.01); *H04W 12/69* (2021.01)

(58) Field of Classification Search
CPC ........ H04L 63/105; H04W 4/10; H04W 4/06; H04W 12/08; H04W 12/0051; H04W 12/189; H04W 72/005
USPC ........................................................... 726/4
See application file for complete search history.

(56) References Cited

U.S. PATENT DOCUMENTS

| 8,244,782 | B2 | 8/2012 | Kuehner et al. |
| 10,007,895 | B2 | 6/2018 | Vanasco |
| 2004/0248597 | A1 | 12/2004 | Mathis |

(Continued)

FOREIGN PATENT DOCUMENTS

WO     2018126980 A1     7/2018

*Primary Examiner* — Fatoumata Traore
*Assistant Examiner* — Samuel Ambaye

(57) ABSTRACT

A method and console are provided to create and manage dispatch unit identities on multiple independent communications systems. A console server receives a first dispatch unit list from a first radio system. The first dispatch unit list includes a first plurality of dispatch unit IDs from the first radio system. The console server receives a second dispatch unit list from a second radio system. The second dispatch unit list includes a second plurality of dispatch unit IDs from the second radio system. The console server creates a first role that includes at most one dispatch unit ID from each radio system. Multiple roles can be created by the console server. Upon authenticating a dispatcher at the console server, the console server presents a menu of roles available to the dispatcher. The menu of roles can include all roles on the console server or only the roles that the dispatcher is allowed to choose and that are currently available. Upon receiving a valid selection from the dispatcher, the console server associates the selected role with the dispatcher and makes the selected role unavailable to other dispatchers until released by the dispatcher that selected it. While associated with a dispatcher, the dispatch console uses the relationship of dispatch unit ID and associated communication system defined in the role to enable the single dispatcher to be identified correctly on the associated communications systems being used.

18 Claims, 4 Drawing Sheets

(51) Int. Cl.
*H04W 12/08* (2021.01)
*H04W 12/69* (2021.01)

(56) References Cited

U.S. PATENT DOCUMENTS

| | | | |
|---|---|---|---|
| 2005/0037794 A1* | 2/2005 | Namm | H04W 4/90 |
| | | | 455/519 |
| 2009/0125564 A1 | 5/2009 | Walsh et al. | |
| 2010/0177661 A1* | 7/2010 | Dailey | H04W 8/186 |
| | | | 370/254 |
| 2018/0181901 A1 | 6/2018 | Babcock et al. | |

* cited by examiner

METHOD AND CONSOLE SERVER FOR CREATING AND MANAGING DISPATCH ROLE LISTS

BACKGROUND OF THE INVENTION

Dispatch operations are increasingly centralized through consolidation of dispatch centers. This may result in a need for command and control centers that are capable of interfacing with multiple independent radio systems.

A dispatcher monitoring resources from multiple radio systems may need to represent themselves on each radio system according to identities managed independently by those radio systems. In addition, dispatchers may need to fulfill different job functions depending, for example, on the situational need.

In current systems, a Push To Talk (PTT) Identity can be provisioned to a console, but using different PTT IDs from multiple systems is problematic. To use a different PTT ID requires the provisioning authority to push new information to the console or requires the user to move to a different position to use the new PTT ID.

Therefore a need exists for a method and console server that can use IDs from different systems without suffering from the problems associated with prior art systems.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description below, are incorporated in and form part of the specification and serve to further illustrate various exemplary embodiments of concepts that include the claimed invention, and to explain various principles and advantages of those exemplary embodiments.

Figure 1:
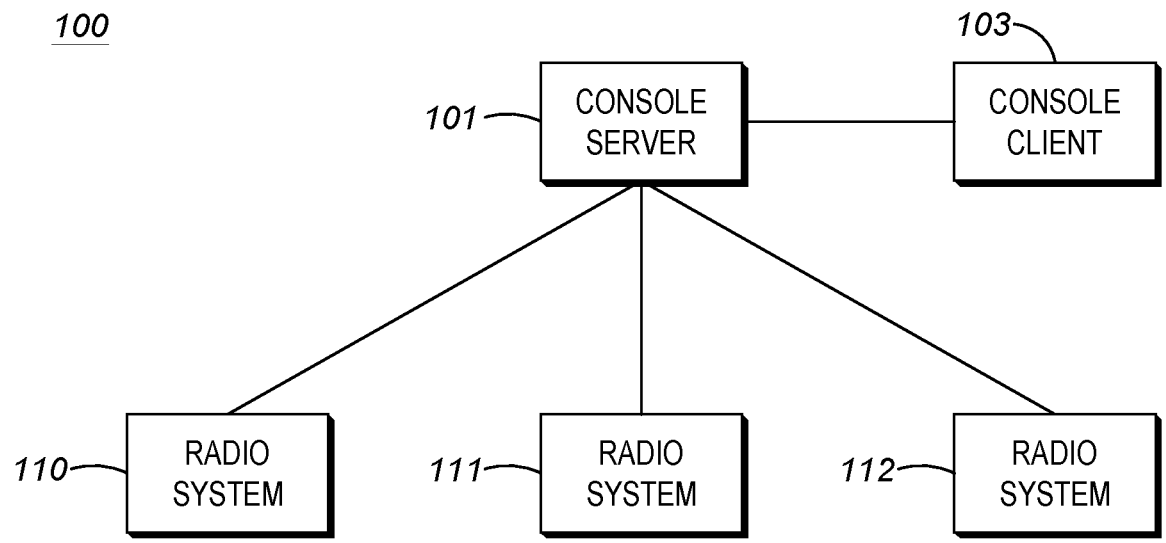
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

An exemplary embodiment provides solutions to allow a dispatcher to select a pre-configured set of radio system identities, known as an identity bundle or role, based on the function or jurisdiction of the shift or the dispatcher. This allows the dispatcher to associate a set of identities for multiple systems, for example based on the role being performed at the time, with themselves. This preferably occurs at the time the dispatcher logs into the console client.

In accordance with an exemplary embodiment, a role is provisioned with identities from various independent radio systems used to accomplish the dispatch function. When transacting audio and control with multiple independent radio systems, the console client uses the role list of dispatch unit IDs and radio systems associated with their username selected after the dispatcher successfully logged into the console client.

In accordance with an exemplary embodiment, when selected by a dispatcher, a role is made unavailable to other dispatchers so that no other dispatcher can use that role while the dispatcher is using it. When logging off, the role is made available to be chosen by other dispatchers.

Therefore, console role lists are defined by a console server as a plurality of roles from identity definitions maintained by owners and operators of the radio systems for transactions with these radio systems.

Each of the above-mentioned embodiments will be discussed in more detail below, starting with example system and device architectures of the system in which the embodiments may be practiced, followed by an illustration of processing blocks for achieving an improved technical method, device, and system for allowing communication devices to create and manage role lists in dispatch systems. Exemplary embodiments are herein described with reference to flowchart illustrations, call flow diagrams, and/or block diagrams of methods, apparatus (systems) and computer program products according to exemplary embodiments. It will be understood that each block of the flowchart illustrations, call flow diagrams, and/or block diagrams, and combinations of blocks in the flowchart illustrations, call flow diagrams, and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart, call flow, and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 depicts a system diagram of a communication system 100 in accordance with an exemplary embodiment of the present invention. Communication system 100 includes a console server 101, a console client 103, and radio systems 110-112. Although only three radio systems 110-112 are depicted in FIG. 1, it should be understood that a typical communication system 100 would include a plurality of systems. Console server 101 preferably includes multiple systems in addition to systems 110-112, although only three systems are shown in FIG. 1 for clarity.

Each of Radio Systems 110-112 is a complete independent communications system, with appropriate interfaces, processing, and storage capabilities for operating a communications system, including identity management of users on the system.

In accordance with an exemplary embodiment, a dispatcher will have a need to talk to other users monitoring a communications resource. These can include other dispatchers or mobile devices in the field. The dispatcher preferably invokes a transmit operation, resulting in a Request to Transmit message, such as a Push to Talk or PTT message, sent to the system responsible for managing communications of the resource. The Request to Transmit message preferably includes the identifying information of the user making the request and the Unit ID or PTTID. If the system is able to grant the call request, for example based upon the floor control rules, the call priority, and other logic used to determine which user may transmit on a channel, a call grant is sent back not only to the requesting console, but also to all units in the communications system monitoring that channel. The call grant preferably includes the PTTID of the dispatcher, who is the source of audio for the call. Entities receiving the call grant use the PTTID information to uniquely identify the audio source for a call and display the information to the user. In accordance with an exemplary embodiment, the information includes an optional alias.

In accordance with an exemplary embodiment, a dispatch transmit operation involves several resources simultaneously. For example, the resources can be a Patch Transmit and a MultiSelect/All-Points-Bulletin Transmit. The resources are preferably controlled by different communications systems. In these exemplary embodiments, the flow described above remains, but is executed in parallel among the systems associated with the resources in the dispatch group transmit operation. In accordance with an exemplary embodiment, the dispatch console transmission request sent to the system includes a dispatch Unit ID identifier associated only to the system responsible for the resource or channel being requested. For example, talk channels 1, 2, and 3 are controlled by radio systems 110, 111, and 112 respectively. A multi-resource transmission from the console using these resources would result in three call request/grant messages; a first request with a first PTTID to radio system 110 for channel 1, a second request with a second PTTID to radio system 111 for channel 2, and a third request with a third PTTID to radio system 112 for channel 3. In each case, the PTTID is uniquely meaningful to the system that defined it, and is used by communication users to identify the source of audio on a call.

Figure 2:
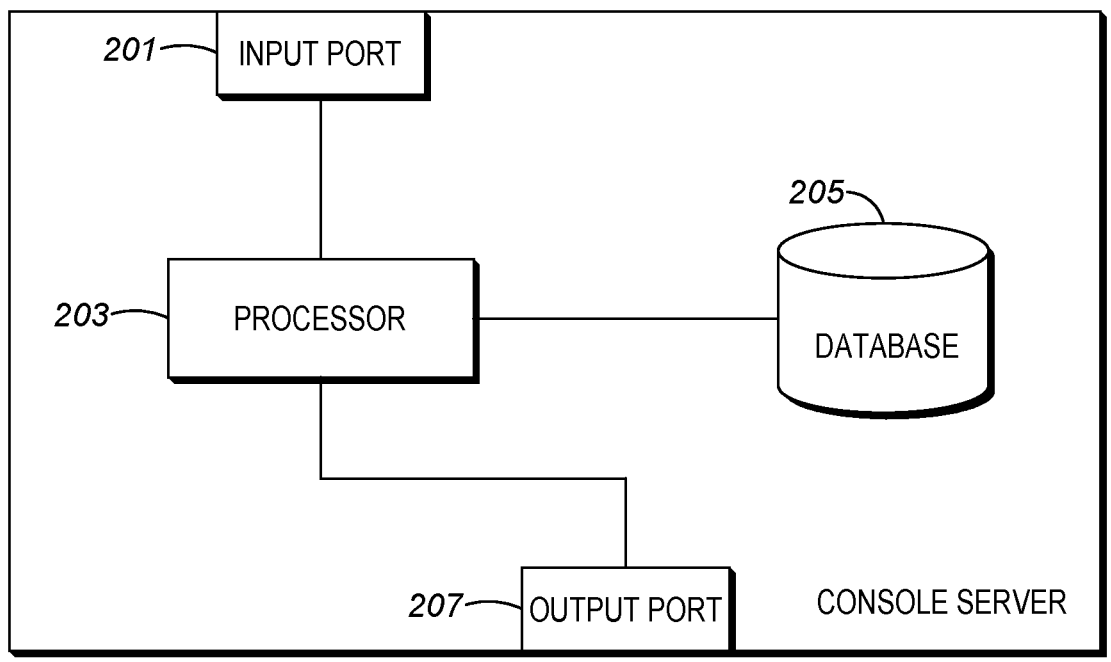
FIG. 2 depicts a schematic diagram of a console switch gateway in accordance with an exemplary embodiment of the present invention.

FIG. 2 depicts a schematic diagram of console server 101 in accordance with an exemplary embodiment of the present invention. In the exemplary embodiment depicted in FIG. 2, console server 101 includes an input port 201, a processor 203, a database 205, and an output port 207. Input port 201 and processor 203 communicate over one or more communication lines or buses, as do processor 203 and output port 207. Wireless connections or a combination of wired and wireless connections are also possible.

Input port 201 receives electronic signals and messages from Systems 110-112 and console client 103. Output port 207 transmits signals and messages to Systems 110-112 and console client 103. Input port 201 and output port 207 are electrically connected to processor 203. Although depicted in FIG. 2 as two separate elements, input port 201 and output port 207 can be a single element.

Processor 203 may include a microprocessor, application-specific integrated circuit (ASIC), field-programmable gate array, or another suitable electronic device. Processor 203 obtains and provides information (for example, from database 205 and/or input port 201), and processes the information by executing one or more software instructions or modules, capable of being stored, for example, in a random access memory ("RAM") area of database 205 or a read only memory ("ROM") of database 205 or another non-transitory computer readable medium. The software can include firmware, one or more applications, program data, filters, rules, one or more program modules, and other executable instructions. Processor 203 is configured to retrieve from database 205 and execute, among other things, software related to the control processes and methods described herein.

Database 205 can include one or more non-transitory computer-readable media, and may include a program storage area and a data storage area. The program storage area and the data storage area can include combinations of different types of memory, as described herein. In the embodiment illustrated, database 205 stores, among other things, instructions for processor 203 to carry out the methods of FIG. 4 and FIG. 5.

Figure 3:
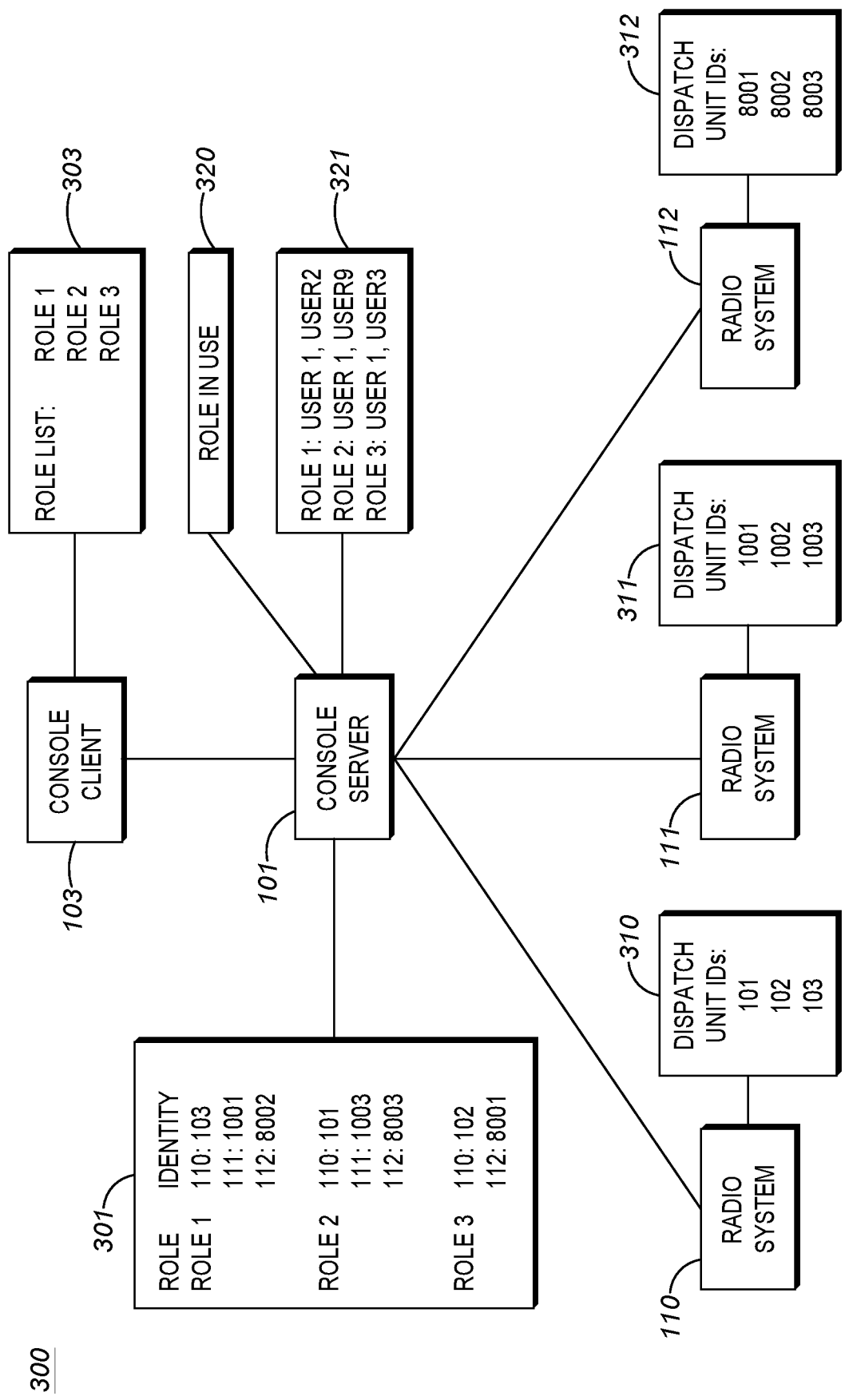
FIG. 3 depicts a system diagram in accordance with an exemplary embodiment of the present invention.

FIG. 3 depicts a system diagram 300 in accordance with an exemplary embodiment of the present invention. Console server 101, console client 103, and Radio Systems 110-112 have been described in FIG. 1. FIG. 3 further comprises Combined Role List 301, Authorization List 321, Roles in Use List 320, Presented Role List 303, First Dispatch Unit List 310, Second Dispatch Unit List 311, and Third Dispatch Unit List 312.

First Dispatch Unit List 310 comprises a list of dispatch unit IDs that are available at radio system 110. In the exemplary embodiment depicted in FIG. 3, First Dispatch Unit List 310 includes Dispatch Unit IDs 101, 102, and 103, which represent the three dispatch IDs that can be used by Console Client 103 at Radio System 110.

Second Dispatch Unit List 311 comprises a list of dispatch unit IDs that are available at radio system 111. In the exemplary embodiment depicted in FIG. 3, Second Dispatch Unit List 311 includes Dispatch Unit IDs 1001, 1002, and 1003, which represent the three dispatch IDs that can be used by Console Client 103 at Radio System 111.

Third Dispatch Unit List 312 comprises a list of dispatch unit IDs that are available at radio system 112. In the exemplary embodiment depicted in FIG. 3, Third Dispatch Unit List 312 includes Dispatch Unit IDs 8001, 8002, and 8003, which represent the three dispatch IDs that can be used by Console Client 103 at Radio System 112.

In accordance with an exemplary embodiment, Combined Role List 301 includes a plurality of roles that have been created by Console Server 101. In the exemplary embodiment depicted in FIG. 3, Combined Role List 301 includes three roles, although it could include more or fewer. The first role includes dispatch unit ID 103 from Radio System 110, dispatch unit ID 1001 from Radio System 111, and dispatch unit ID 8002 from Radio System 112. The second role includes dispatch unit ID 101 from Radio System 110, dispatch unit ID 1003 from Radio System 111, and dispatch unit ID 8003 from Radio System 112. The third role includes dispatch unit ID 102 from Radio System 110 and dispatch unit ID 8001 from Radio System 112. In accordance with an exemplary embodiment, each of the dispatch unit IDs may only be used in one role.

Authorization List 321 identifies a subset of roles from Combined Role list 301 that a dispatcher is authorized to access. Multiple dispatchers may be authorized to access a role. In accordance with an exemplary embodiment, only one dispatcher at a time may claim the role for their dispatch session. Therefore, being authorized to access a role does not guarantee its use, for example if the role is in use by another dispatcher. Console Server 101 determines which dispatchers are authorized to access various roles of Combined Role List 301. Console Server 101 may authorize all users to all roles, may authorize all users to a subset of roles, may authorize a subset of dispatchers to a subset of roles, or may authorize no dispatchers to any roles.

Roles in Use List 320 include a list of roles that have been claimed by dispatchers using System 300. When a dispatcher claims a role, it is preferably added to the roles in use list. When a dispatcher releases a role they had claimed, the role is preferably removed from the roles in use list. In accordance with an exemplary embodiment, Combined Role List 301, Authorization List 321, and Roles In Use List 320 exist in Console Server 101 for the purpose of being able to construct Presentation Role List 303. Combined Role List 301, Authorization List 321, and Roles In Use List 320 are preferably not presented to Dispatch Client 103.

Presented Role List 303 preferably includes a list of roles presented at Console Client 103. In accordance with an exemplary embodiment, an authenticated dispatcher may select one role to serve as the set of PTT IDs representing the dispatcher on the various communications systems 110-112. In accordance with a first exemplary embodiment, Presented Role List 303 includes all roles defined in Combined Role List 301. In accordance with a second exemplary embodiment, Presented Role List 303 includes the subset of all roles from Combined Role List 301 that Console Server 101 has authorized the dispatcher to access as defined by Authorization List 321. In accordance with an exemplary embodiment, Presented Role List 303 includes the subset of all roles from Combined Role List 301 that Console Server 101 has authorized the dispatcher to access and are not in use by other dispatchers.

After authenticating the dispatcher of Console Client 103, Presented Role List 303 is displayed to the authenticated dispatcher. The dispatcher is allowed to choose one of the roles displayed in Presented Role List 303. This will be discussed in more detail in FIG. 5 below.

Figure 4:
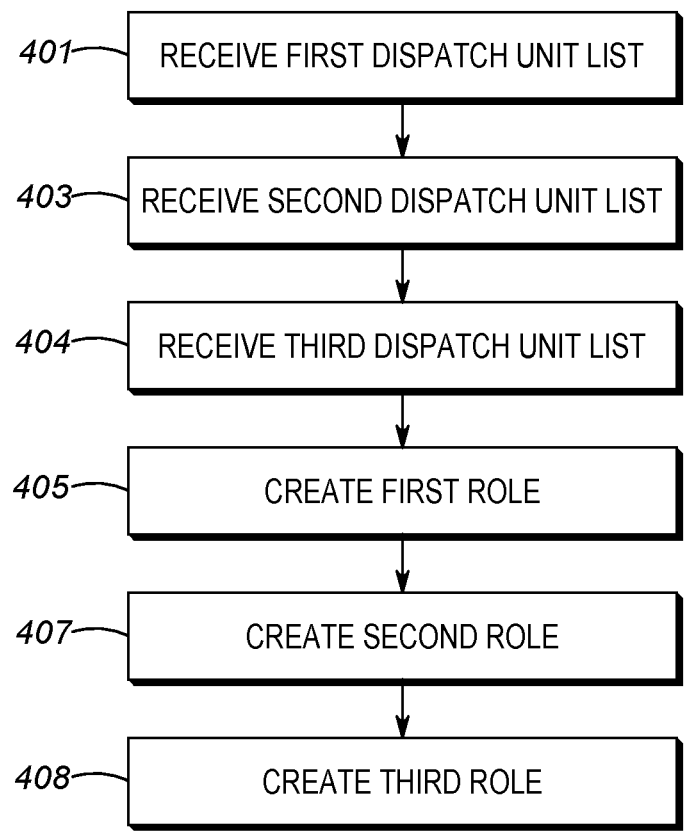
FIG. 4 depicts a flow chart in accordance with an exemplary embodiment of the present invention.

FIG. 4 depicts a flow chart 400 of a method to build a combined role list in accordance with an exemplary embodiment of the present invention. Although the flow chart of FIG. 4 only includes three dispatch unit lists received from three different radio systems, it should be understood that Console Server 101 could receive more dispatch unit lists from more radio systems, only three radio systems are depicted in FIG. 4 for clarity.

Console Server 101 receives (401) first dispatch unit list 310 from radio system 110. First dispatch unit list 310 includes a first plurality of dispatch unit IDs from first radio system 110. In this exemplary embodiment, first dispatch unit list 310 includes dispatch unit IDs 101, 102, and 103.

Console Server 101 receives (403) second dispatch unit list 311 from radio system 111. Second dispatch unit list 311 includes a second plurality of dispatch unit IDs from second radio system 111. In this exemplary embodiment, second dispatch unit list 311 includes dispatch unit IDs 1001, 1002, and 1003.

Console Server 101 receives (404) third dispatch unit list 312 from radio system 112. Third dispatch unit list 312 includes a third plurality of dispatch unit IDs from second radio system 112. In this exemplary embodiment, third dispatch unit list 312 includes dispatch unit IDs 8001, 8002, and 8003.

Console Server 101 creates (405) a first role. In accordance with an exemplary embodiment, the first role includes one of the dispatch unit IDs from first dispatch unit list 310, one of the dispatch unit IDs from second dispatch unit list 311, and one of the dispatch unit IDs from third dispatch unit list 312. Console Server 101 then defines which dispatchers are authorized to access the first role in Authorization List 321.

Console Server 101 creates (407) a second role. In accordance with an exemplary embodiment, the second role includes one of the dispatch unit IDs from first dispatch unit list 310, one of the dispatch unit IDs from second dispatch unit list 311, and one of the dispatch unit IDs from third dispatch unit list 312. Console Server 101 then defines which dispatchers are authorized to access the second role in Authorization List 321.

Console Server 101 creates (408) a third role. In accordance with an exemplary embodiment, the third role includes one of the dispatch unit IDs from first dispatch unit list 310 and one of the dispatch unit IDs from third dispatch unit list 312. Console Server 101 then defines which dispatchers are authorized to access the third role in Authorization List 321.

In accordance with an exemplary embodiment, each role only includes up to one dispatch unit ID from each radio system.

Figure 5:
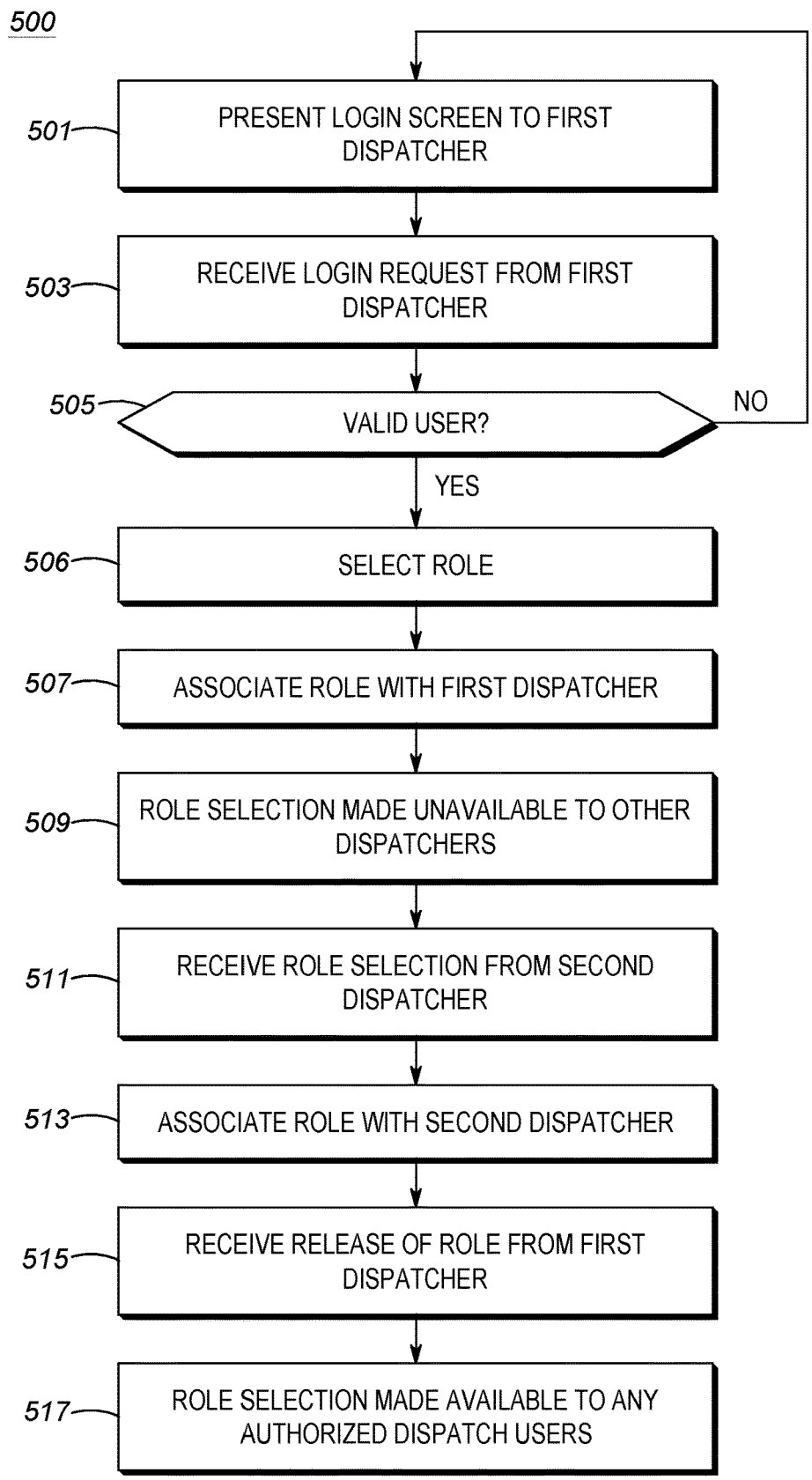
FIG. 5 depicts a flow chart in accordance with an exemplary embodiment of the present invention.

FIG. 5 depicts a flow chart 500 of a method to electronically process a role selection for Console Client 103 in accordance with an exemplary embodiment. In this exemplary embodiment, a list of roles is presented to a dispatcher at a console client. When the dispatcher selects one of the presented roles, if that role is available, the role is assigned to the dispatcher and added to Roles in Use List 320 making it unavailable to any other dispatchers until the dispatcher claiming the role releases it, at which point it is removed from Roles in Use List 320, making it available for any authorized dispatcher to claim.

A second dispatcher who successfully logs into console client 103 will preferably be presented with a list of roles. In the situation when the first dispatcher is already utilizing a selected role that is displayed in the Presented Role List of the second dispatcher and the second dispatcher chooses a role that is already in use, Console Server 101 will alert the dispatcher that the selected role is already in use and prompt the dispatcher to choose a different role. In an alternate exemplary embodiment, the role in use is removed from the Presented Role List so that the second dispatcher will not have the option to choose a role that is already in use. In similar manner, once the second dispatcher selects a role, that role is added to Roles In Use List 320 making it unavailable to other dispatchers until the second dispatcher releases the role, at which point it will be removed from Roles In Use List 320 making it available for any authorized dispatcher to claim.

Console Server 101 presents (501) a login screen to the first dispatcher. The login screen preferably requests user credentials. In accordance with the exemplary embodiment depicted in FIG. 5, the first dispatcher utilizes Console Client 103.

Console Server 101 receives (503) a login request from the first dispatcher. In an exemplary embodiment, the login request includes user credentials.

Console Server 101 determines (505) if the dispatcher is authenticated based on the provided user credentials. If not, the process returns to step 501 and presents a login screen to the dispatcher. If the dispatcher is successfully authenticated, Console Server 101 creates Presented Role List 303 for the dispatcher.

In accordance with an exemplary embodiment, if the dispatcher is authenticated at step 505, Console Client 103 presents Presented Role List (303) to the dispatcher. In this exemplary embodiment, if the dispatcher chooses a role that is currently being used by another dispatcher, Console Client preferably presents a message to the dispatcher that the chosen role is unavailable and presents a new role list for the dispatcher to choose from.

In accordance with an exemplary embodiment, Console Server 101 determines which roles to include in the Presented Role List displayed to a dispatcher. The determination of which roles to display to the dispatcher can be made based upon the identity of the dispatcher or the console client that the dispatcher is connecting to Console Server 101 from.

In an exemplary embodiment, the dispatcher selects (506) a role. In accordance with an exemplary embodiment and for purposes of the remainder of FIG. 5, the selected role is available to be used by the dispatcher.

Console Server 101 associates (507) the role selection with the first dispatcher. In accordance with an exemplary embodiment, associating the role selection with the first dispatcher allows the first dispatcher to utilize the dispatch unit IDs at each radio system that were a part of the role that was selected.

Console Server 101 makes (509) the selected role unavailable to other dispatchers by noting the selected role in Roles In Use List 320. It should be understood that the role selected is still part of the combined role list.

Console Server 101 receives (511) a role selection from a second dispatcher. In accordance with an exemplary embodiment, it is assumed that the second dispatcher has logged into a console client and has been properly authenticated. In accordance with an exemplary embodiment, Presented Role List shown to the second dispatcher does not include the role selected by the first dispatcher.

If the second dispatcher is authenticated, Console Server 101 associates (513) the role selection with the second dispatcher. In accordance with an exemplary embodiment, associating the role selection with the second dispatcher allows the second dispatcher to utilize the dispatch unit IDs at each radio system that were a part of the role that was selected. The role selection is then noted in Roles In Use List 320 so that no other dispatcher can use that role until the second dispatcher releases the role, at which point the role is removed from Roles In Use List 320 making it available to any authorized user. The role selected is not removed from the combined role list.

In accordance with an exemplary embodiment, Console Server 101 receives (515) a release of the role selection from the first dispatcher. This release indicates that the first dispatcher is done using the role selection, and Console Server 101 may return the role to be available for any authorized dispatcher.

Console Server 101 returns (517) the released role selection to be available for any authorized dispatcher by removing it from Roles In Use List 320.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot send unicast messages to each of the talkgroup members connected to a broadband network, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B"

should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server, or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

We claim:

1. A method at a console server comprising
receiving a first dispatch unit list from a first radio system, the first dispatch unit list comprising a first plurality of dispatch unit IDs from the first radio system;
receiving a second dispatch unit list from a second radio system, the second dispatch unit list comprising a second plurality of dispatch unit IDs from the second radio system; and
creating a first role, the first role including one of the first plurality of dispatch unit IDs and one of the second plurality of dispatch unit IDs;
authenticating a dispatcher;
presenting a presented role list to the dispatcher;
receiving a role list selection from the dispatcher; and
associating the role list selection with the dispatcher such that the dispatcher utlitizes the one of the first plurality of dispatch unit IDs when on the first radio system and the one of the second plurality of dispatch unit IDs when on the second radio system.

2. The method of claim 1, the method further comprising creating a second role, the second role including a second of the first plurality of dispatch unit IDs and a second of the second plurality of dispatch unit IDs.

3. The method of claim 2, wherein the second of the first plurality of dispatch unit IDs is distinct from the one of the first plurality of dispatch unit IDs.

4. The method of claim 2, wherein the second of the second plurality of dispatch unit IDs is distinct from the one of the second plurality of dispatch unit IDs.

5. The method of claim 1, the method further comprising the step of making role list selection unavailable to other dispatchers by adding the role list selection to a roles in use list.

6. The method of claim 5, the method further comprising the steps of:
receiving a release of the role list selection from the dispatcher; and
returning the role list selection to be claimed by any other dispatcher authorized to utilize the role list selection by removing the role list selection from the roles in use list.

7. The method of claim 1, wherein the step of presenting a role list to the dispatcher comprises presenting a combined role list to the dispatcher, wherein the combined role list comprises all roles at the console server.

8. The method of claim 1, wherein the step of presenting a role list to the dispatcher comprises presenting a list of roles the dispatcher is authorized to access.

9. The method of claim 1, wherein the step of presenting a role list to the dispatcher comprises presenting a list of roles the dispatcher is authorized to access, wherein the list of roles are not in use by other dispatchers.

10. A console server comprising:
an input port for:
receiving a first dispatch unit list from a first radio system, the first dispatch unit list comprising a first plurality of dispatch unit IDs from the first radio system; and
receiving a second dispatch unit list from a second radio system, the second dispatch unit list comprising a second plurality of dispatch unit IDs from the second radio system; and
a processor for creating a first role, the first role including one of the first plurality of dispatch unit IDs and one of the second plurality of dispatch unit IDs;
authenticating, by the processor, a dispatcher;
wherein the console server further comprises an output port for presenting a role list to the dispatcher;
receiving, by the input port, a first role selection from the dispatcher; and
associating, by the processor, the first role with the dispatcher such that the dispatcher utilizes the one of the first plurality of dispatch unit IDs when on the first radio system and the one of the second plurality of dispatch unit IDs when on the second radio system.

11. The console server of claim 10, wherein the processor is further configured for creating a second role, the second role including a second of the first plurality of dispatch unit IDs and a second of the second plurality of dispatch unit IDs.

12. The console server of claim 11, wherein the second of the first plurality of dispatch unit IDs is distinct from the one of the first plurality of dispatch unit IDs.

13. The console server of claim 11, wherein the second of the second plurality of dispatch unit IDs is distinct from the one of the second plurality of dispatch unit IDs.

14. The console server of claim 10, wherein the processor is further configured for making role list selection unavailable to other dispatchers by adding the role list selection to a roles in use list.

15. The console server of claim 14, wherein the console server is further configured for:
receiving a release of the role list selection from the dispatcher; and
returning the role list selection to be claimed by any other dispatcher authorized to utilize the role list selection by removing the role list selection from the roles in use list.

16. The console server of claim 10, wherein the step of presenting a role list to the dispatcher comprises further configuring the output port for presenting a combined role list to the dispatcher, wherein the combined role list comprises all roles at the console server.

17. The console server of claim 10, wherein the step of presenting a role list to the dispatcher comprises further configuring the output port for presenting a role list to the dispatcher comprises presenting a list of roles the dispatcher is authorized to access.

18. The console server of claim 17, wherein the step of presenting a role list to the dispatcher comprises further configuring the output port for presenting a list of roles the dispatcher is authorized to access, wherein the list of roles are not in use by other dispatchers.

\* \* \* \* \*